United States Patent [19]
Melton et al.

[11] Patent Number: 6,066,227
[45] Date of Patent: May 23, 2000

[54] SYSTEM AND METHOD FOR FORMING A THERMOPLASTIC CARPET SEAM

[75] Inventors: Carlton R. Melton, Landrum, S.C.; Thomas E. Pack, Rutherfordton, N.C.

[73] Assignee: Mohawk Industries, Inc., Calhoun, Ga.

[21] Appl. No.: 09/097,841

[22] Filed: Jun. 15, 1998

[51] Int. Cl.[7] .................................................. B29C 65/02
[52] U.S. Cl. .................................. 156/272.2; 156/304.4; 156/304.6; 156/304.7; 156/379.7
[58] Field of Search .......................... 156/272.2, 275.1, 156/275.5, 304.1, 304.3, 304.4, 304.5, 304.6, 304.7, 379.6, 379.7

[56] References Cited

U.S. PATENT DOCUMENTS

| | | | |
|---|---|---|---|
| 3,564,204 | 2/1971 | Mense | 156/304.4 X |
| 4,416,713 | 11/1983 | Brooks | 156/64 |
| 4,525,233 | 6/1985 | Brooks | 156/273.9 |
| 4,565,728 | 1/1986 | Gray et al. | 428/200 |
| 4,610,906 | 9/1986 | Brooks | 428/102 |
| 5,330,604 | 7/1994 | Allum et al. | 156/304.7 |

OTHER PUBLICATIONS

Literature from Carder Industries on Electra Seam seamer (2 pgs.). Published prior to Oct. 1996.

*Primary Examiner*—James Sells
*Attorney, Agent, or Firm*—Troutman Sanders LLP; Gerald R. Boss, Esq.

[57] ABSTRACT

A system for forming a carpet seam including source and take-up carpet roller assemblies and a seaming support having a work surface upon which two carpet sections can be aligned. The seaming support includes a roller and an electric current source for providing an electric current to electrically self-heating thermoplastic bonding tape. The method of the present invention includes the steps of cutting out a defective section of carpet on the seaming support work surface, aligning the leading edge of the resulting front carpet section with trailing edge of the rear carpet section, applying a strip of electrically self-heating thermoplastic bonding tape to the backing side of the carpet, applying an electric current to the tape, and rolling the rejoined carpet onto the take-up roller assembly.

19 Claims, 6 Drawing Sheets

SYSTEM AND METHOD FOR FORMING A THERMOPLASTIC CARPET SEAM

BACKGROUND OF THE INVENTION

1. Technical Field

This invention relates generally to an apparatus and method for manufacturing carpet. Particularly, this invention relates to an apparatus and method for forming a seam between two pieces of carpet during the carpet manufacturing process.

2. Description of the Prior Art

During the carpet manufacturing process, dye and weave defects inevitably occur and, unless removed, can significantly decrease the value of a finished roll of carpet. Following identification during the carpet inspection process, defective sections of carpet are usually cut out and removed from finished rolls of carpet. However, cutting out one or more defective sections from a carpet roll can result in short rolls which may not be as useful or valuable as full length carpet rolls.

Currently, short carpet sections are sometimes rejoined during installation through the use of manually applied heat activated or electrically self-heating thermoplastic bonding tape. However, while these methods of seam formation have been suitable for forming seams during carpet installation, they are not optimal for rejoining large carpet sections following removal of defective carpet sections during the manufacturing process. For instance, it is difficult to precisely align the edges of the carpet by hand when dealing with large sections of carpet, which can result in production of aesthetically displeasing, non-uniform seams which are unacceptable in a finished carpet product. Furthermore, the application of the tape to form a seam according to prior methods is complex and requires more work space and time to perform than is desirable in the manufacturing environment.

As previously mentioned, it is well known to utilize electrically self-heating thermoplastic bonding tape to join adjacent sections of carpet and to form a seam during carpet installation. In order to form a carpet seam, the bonding tape is positioned at the carpet seam and electrodes are attached at either end of the bonding tape. An electrical current is then passed through the tape to heat the tape and melt a thermoplastic adhesive layer. The electrodes are removed and the thermoplastic adhesive is allowed to cool and set, bonding the edges of the seam to the tape and to one another. However, while this method is useful for joining adjacent carpet sections during installation, it is not desirable to require carpet customers to pay for having a carpet installer use extra time and equipment to correct defects which could have been corrected in the carpet manufacturing process.

The use of electrically self-heating thermoplastic bonding tape to bond two adjacent sections of carpet to form a seam is disclosed in U.S. Pat. Nos. 4,525,233 and 4,610,906 to Brooks. These patents each disclose a method wherein carpet sections are adjacently positioned and joined upon a strip of electrically self-heating thermoplastic bonding tape on the floor to which they are to be permanently attached. However, these methods are adapted specifically to the formation of carpet seams between adjacent carpet sections during installation of the carpet on a floor rather than to the joining of two carpet sections during the manufacturing process.

Therefore, it is an object of the present invention to provide a system for easily joining two carpet sections during the manufacturing process which will allow the finished carpet to be quickly and easily rerolled for delivery to the customer as a finished carpet product It is a further object of the present invention to provide a system for easily joining two sections of carpet during the manufacturing process which allows a high quality seam to be produced both faster and easier than would be possible by forming the seam by hand.

It is yet another object of the present invention to provide a method for splicing a defective section from a carpet during the manufacturing process and rejoining the resulting carpet sections into one full length carpet which is relatively compact and does not require spreading the carpet sections out upon a floor.

SUMMARY OF THE INVENTION

The above objectives are accomplished according to the present invention by providing a system for forming a carpet seam between first and second carpet sections. The system includes a carpet source for providing carpet, which includes a driver for moving the carpet, and a seaming support which receives the carpet from the carpet source. A work surface supports the carpet after it has been divided into first and second carpet sections upon removal of a defective carpet section. A strip of electrically self-heating thermoplastic bonding tape joins the first and second sections of carpet. The tape is extended laterally across the work surface so that one end of the strip is positioned adjacent to one side of the work surface and the other end of the strip is positioned adjacent to the opposing side of the work surface. An electric current source provides an electric current to the electrically self-heating thermoplastic bonding tape which joins the first and second carpet sections into a continuous roll of carpet.

The aforementioned and other aspects, objects and advantages of the present invention are described in the detailed description and attached illustrations which follow.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown, and wherein.

DETAILED DESCRIPTION OF THE INVENTION

Figure 1:
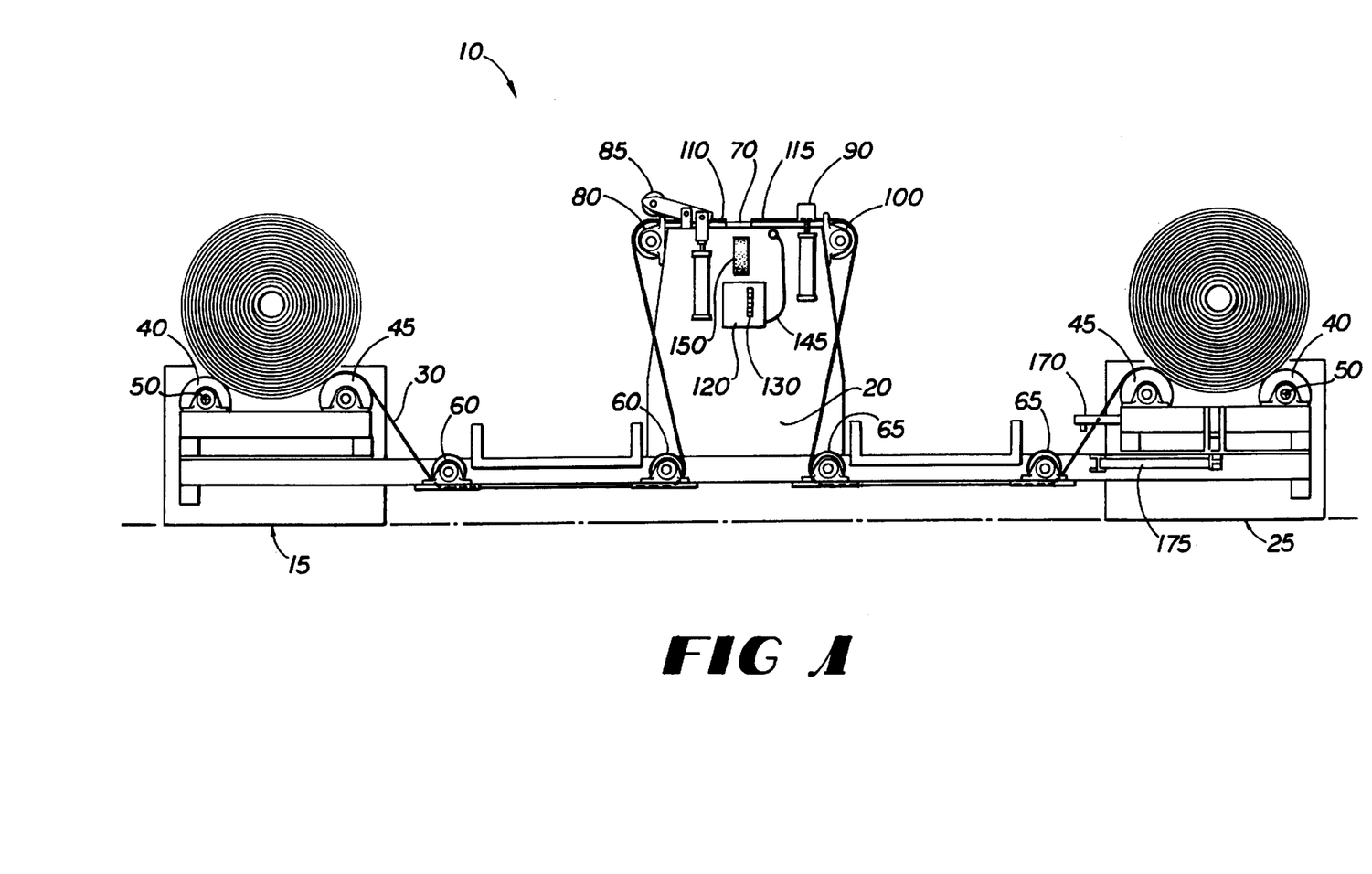
FIG. 1 is a side elevation view of the system for forming a thermoplastic carpet seam in accordance with the present invention.
Figure 2:
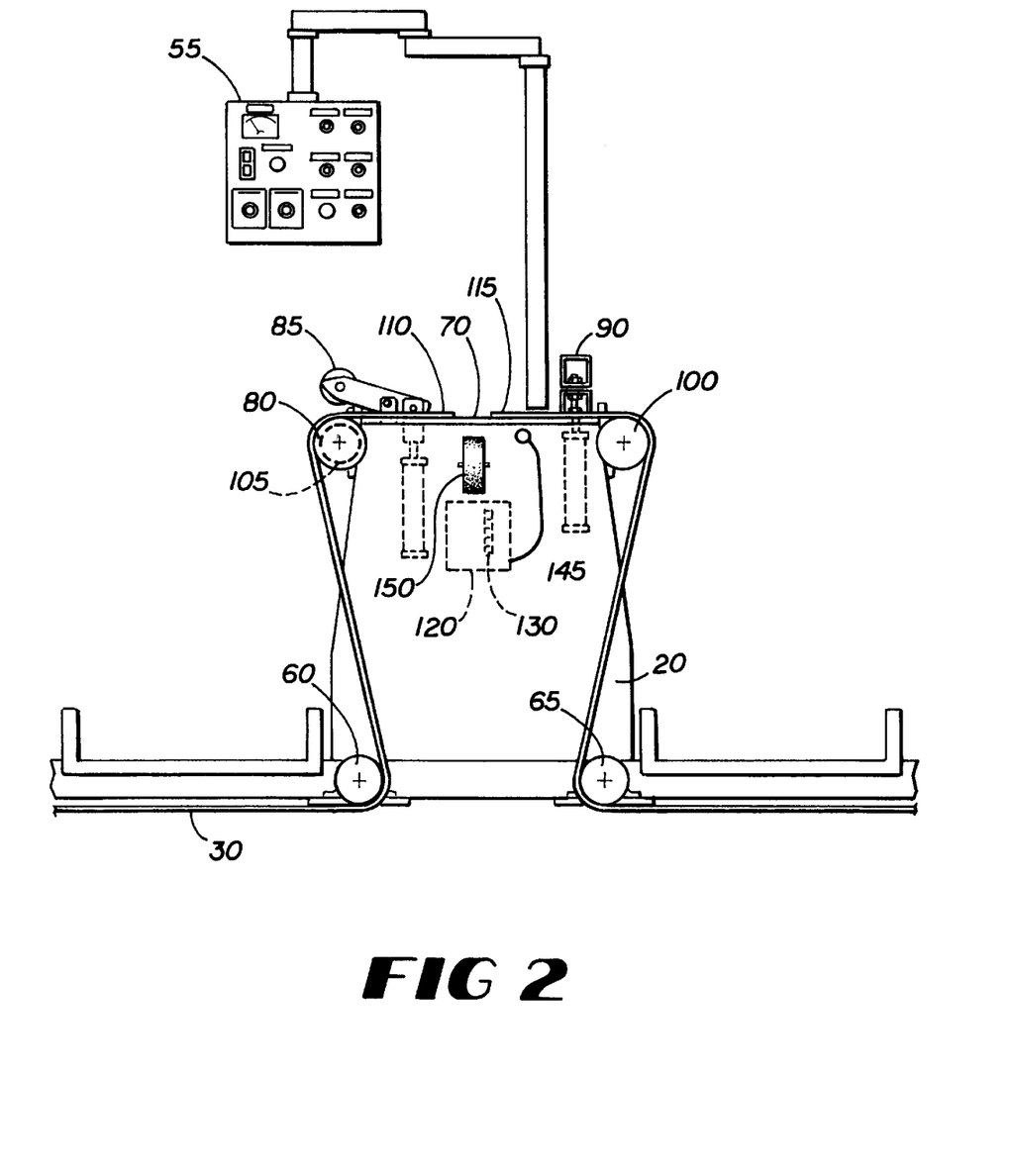
FIG. 2 is a side elevation view of a seaming support in accordance with the present invention.

Referring to FIGS. 1 and 2, in a preferred embodiment, the carpet seam forming system 10 includes source carpet roller assembly 15 which supplies carpet 30 to seaming support 20 and take-up carpet roller assembly 25 which receives carpet 30 from seaming support 20. By activation of the roller assemblies 15 and 25, a piece of carpet 30 may be moved onto the seaming support 20 for cutting to remove a defective carpet section 35 and rejoining without requiring the entire carpet 30 or sections thereof to be spread out.

Figure 3:
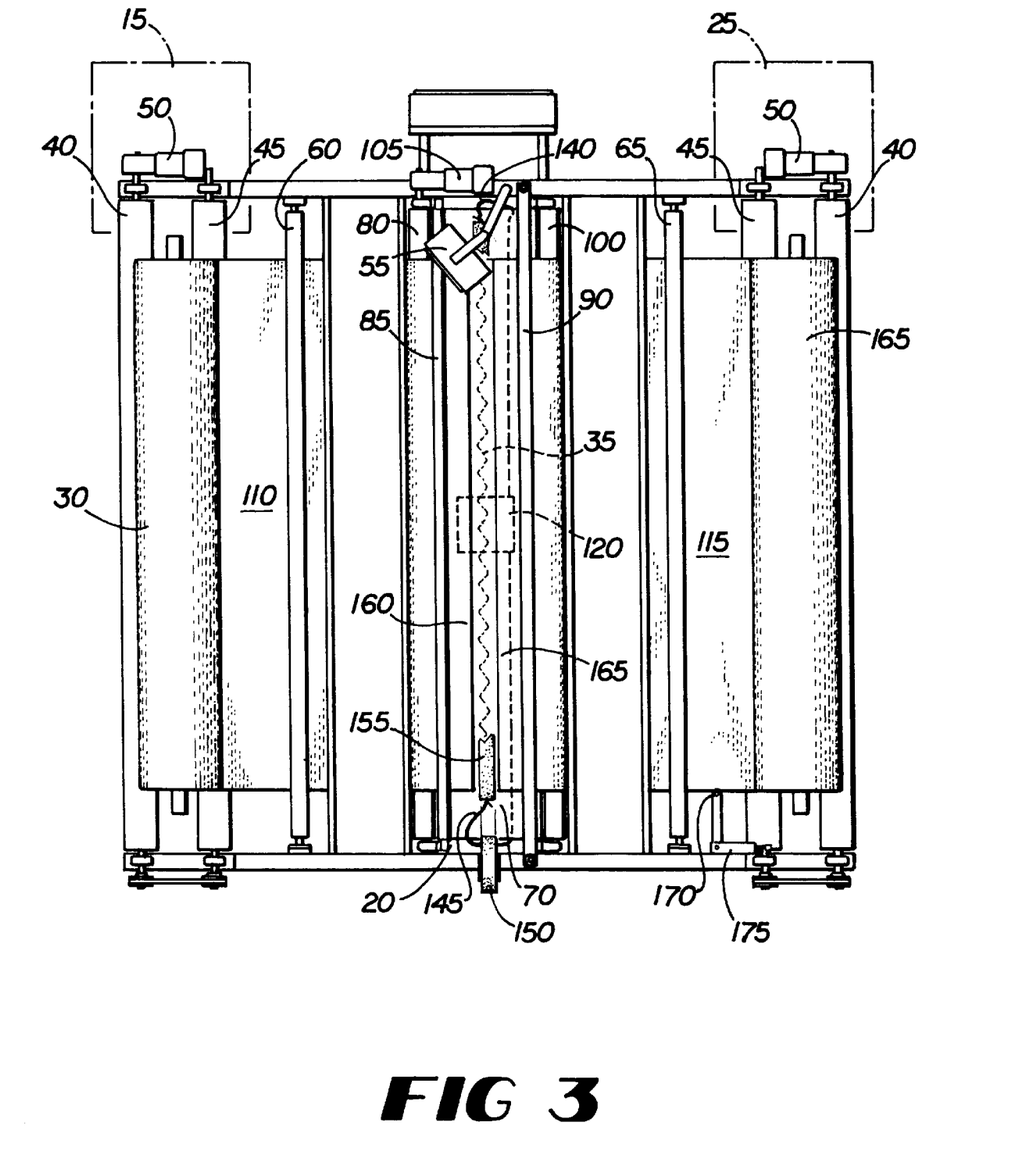
FIG. 3 is a plan view of a seaming support in accordance with the present invention.

In the preferred embodiment, source carpet roller assembly 15 and take-up carpet roller assembly 25 each include a standard carpet roller assembly, the use of which is well known in the carpet manufacturing industry. Each of the carpet roller assemblies 15 and 25 includes an eight inch drive roller 40 and a parallel, adjacently disposed eight inch guide roller 45 which, in combination, can support and turn a carpet roll. Drive rollers 40 are connected and driven by roller motors 50 which are operable remotely from operator control panel 55. As can be seen in FIGS. 1 and 3, carpet feeds into or out of each carpet roller assembly 15 or 25 over assembly guide rollers 45.

Additional four-inch front guide rollers 60 and rear guide rollers 65 are provided to guide carpet from the source roller assembly 15 to the seaming support 20 and from the seaming support 20 to take-up carpet roller assembly 25 respectively. Guide rollers 60 and 65 are not motor driven and are positioned to guide carpet along a desired path to and from the rollers and the seaming support. One of ordinary skill in the art will recognize that the guide rollers 60 and 65 may be of any size and that other mechanisms for guiding the carpet through the system may also be used.

An edge guide sensor 170 and a linear actuator 175 are provided along one side of the carpet receiving portion of take-up roller assembly 15 to sense the carpet position and to allow the entire take-up roller assembly 25 to pivot in the plane of carpet travel. This is necessary to ensure that the ends of take-up carpet roll 165 are straight and square with the carpet core and to prevent telescoping of the take-up carpet roll 165.

The seaming support 20 includes a work surface 70 for supporting one or more sections of carpet. In the preferred embodiment, work surface 70 is constructed from a horizontally disposed sheet of plywood. Plywood and similarly resiliently piercable materials offer the advantage of serving as a substrate for receiving carpet retaining pins, which may optionally be used to immobilized a carpet section during the seaming process.

The seaming support 20 includes a carpet handling system 75 which includes a positioning roller 80, a pneumatic press clamp roller 85, a pneumatic presser bar 90 and a rubber guide roller 100. The positioning roller 80 is connected to a positioning roller motor 105 which is operable in response to control signals from operator control panel 55. The positioning roller 80 is positioned adjacent to the front edge of work surface 70 and serves, in part, to guide a front carpet section 110 from guide rollers 60 to the work surface 70. As shown in FIG. 1, the pneumatic press clamp roller 85 is positioned adjacent to and in opposition with positioning roller 80 and is operable in response to control signals from operator control panel 55 to clamp front carpet section 110 to positioning roller 80. Once the front carpet section 110 has been clamped, positioning roller motor 105 may be actuated in a forward or reverse direction to move positioning roller 80 and hence front carpet section 110 to a desired location on work surface 70.

A pneumatic presser bar 90 extends above the rear portion of work surface 70 and is operable in response to control signals from operator control panel 55 to clamp a rear carpet section 115 into position prior to seam formation. Rubber guide roller 100 is disposed adjacent to the rear edge of work surface 70 and serves to guide the trailing edge of rear carpet section 115 from work surface 70 to guide rollers 65.

An electric current source unit 120 is positioned adjacent to a lateral side of seaming support 20 to provide a source of electric current to a strip of electrically self-heating thermoplastic bonding tape 155 when applied to a carpet seam 125. The electric current source 120 includes a power source 130 and electrodes 140 and 145 for attachment to either end of a carpet seam 125 at the opposing lateral edges of work surface 70. In a presently preferred embodiment, the electric current source 120 comprises a Model CT-12 Electra-Seam™ unit produced by Carder Industries, Inc.

Figure 4:
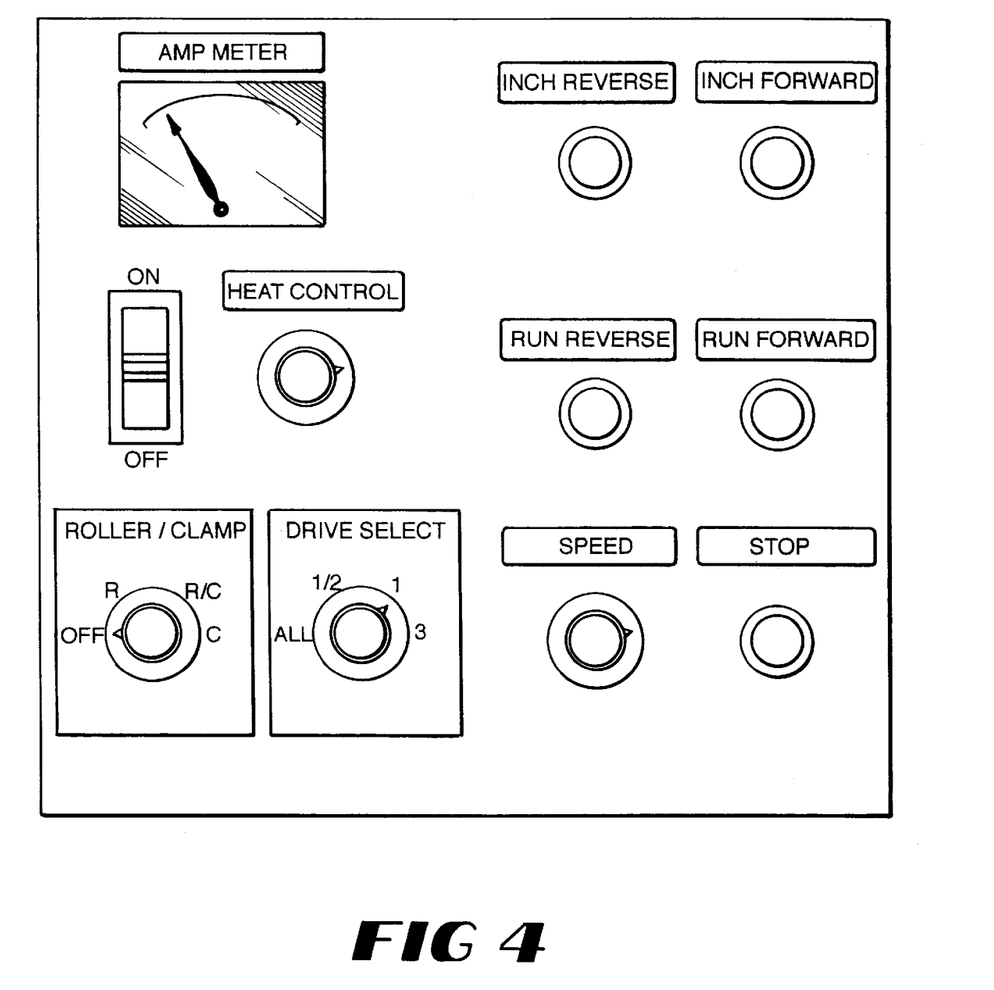
FIG. 4 is a frontal view of an operator control panel in accordance with the present invention.

As shown in FIG. 4, operation of system 10 is controlled from operator control panel 55. The operator control panel 55 includes both a set of operator controls for selection of system parameters and a programmable logic controller for generation of control signals to match the parameters selected. In the preferred embodiment, the operator control panel 55 includes operator controls for selecting which drive rollers are active, roller speed and direction, position of pneumatic press clamp roller 85, position of presser bar 90, the temperature of the electrically self-heating thermoplastic bonding tape 155 and/or electric current flow provided from electric current source 120.

In a further preferred embodiment, the system 10 includes a tape dispenser 150 attached to seaming support 20 adjacent to work surface 70. Tape dispenser 150 is adapted to receive and dispense a roll of electrically self-heating thermoplastic bonding tape 155, such as the Electra-Seam™ tape, manufactured by Carder Industries, Inc. Tape dispenser 150 is attached to a side surface of seaming support 20 to conveniently supply electrically self-heating thermoplastic bonding tape 155 to work surface 70.

Figure 5:
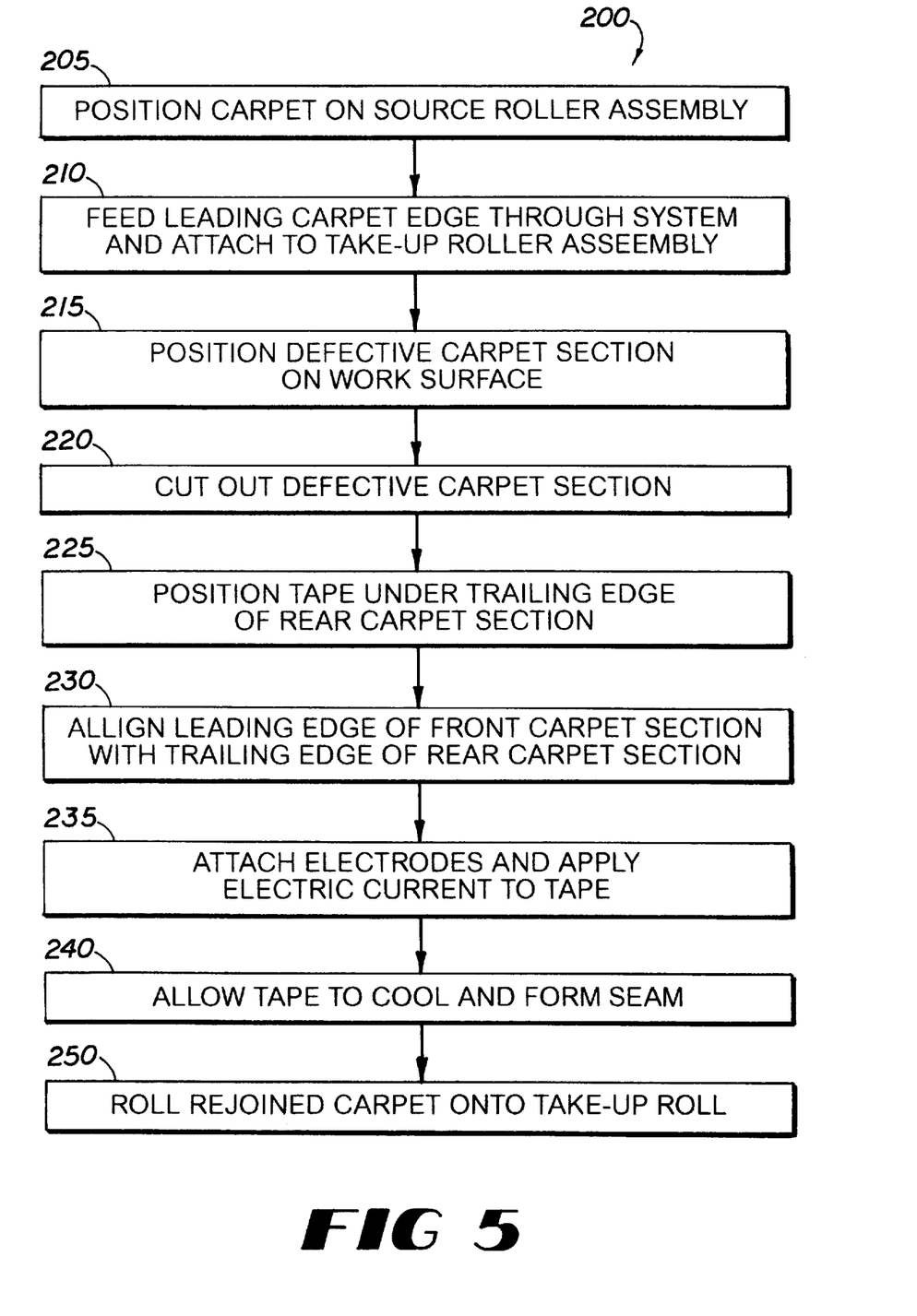
FIG. 5 is a flow chart illustrating the steps of the method for forming a thermoplastic carpet seam in accordance with the present invention.
Figure 6:
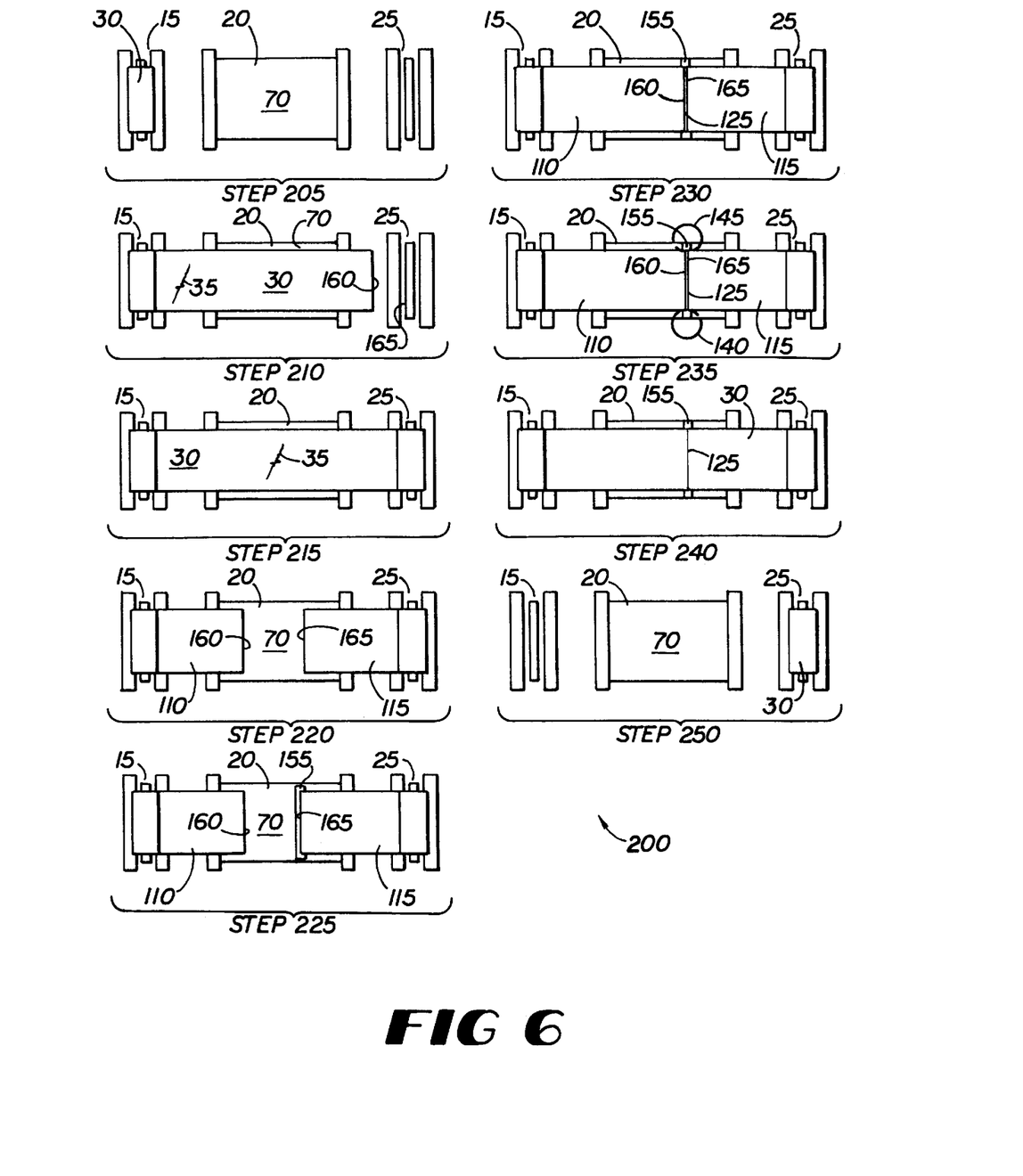
FIG. 6 is a diagrammatic representation of an overhead view of the work surface and carpet position thereupon at selected steps in the process for forming a thermoplastic carpet seam in accordance with the present invention.

Referring to FIGS. 1, 5 and 6, the method 200 for removing a carpet defect and forming a thermoplastic carpet seam utilizing the system 10 will be described in detail. The process begins at step 205, wherein a full length carpet 30 is rolled and transferred to the system 10 and positioned in the source carpet roller assembly 15 following inspection and marking wherein any defective areas have been identified and marked. Alternatively, the carpet 30 may be transferred directly to the source carpet roller assembly 15 and inspected while being processed by the system 10.

Next, at step 210, the leading edge 160 of the source fill-length carpet 30 is pulled through guide rollers 60 and 65 and fed to take-up carpet roller assembly 25 for rolling into a take-up roll 165. Once the carpet 30 has been fed to take-up carpet roller assembly 25, the carpet 30 can be pulled either forward or backwards through the system 10 through activation of the drive motors 50 of carpet roller assemblies 15 and 25. Also at step 210, the full-length carpet 30 is positioned such that a section of the carpet 30 overlies the work surface 70 of seaming support 20 with its backing side down.

At step 215, a defective section 35 of the full-length carpet 30 is identified by the system operator and the roller drive motors 50 are operated to bring the defective section 35 of source carpet 30 onto the work surface 70 of seaming support 20. If the source carpet 30 has not been inspected, the operator may inspect it for defects at this time, otherwise, the operator simply moves previously identified defective carpet section 35 forward onto the work surface 70. Once the defective carpet section has been positioned over work surface 70, the operator engages press clamp roller 85 and pneumatic presser bar 90 to clamp the carpet 30 into position.

Then, at step 220, the operator manually cuts out the defective carpet section 35 by making a lateral cut to either side of the defective carpet section 35. When cut, the full length carpet section is effectively divided into a front carpet section 110 and a rear carpet section 115. It is important that the pattern of the carpet be matched when performing the cuts so that the integrity of the pattern will be preserved after rejoining the remaining carpet sections. It should be obvious to one of ordinary skill in the art that the cutting process can also be automated, if so desired, using readily available carpet cutting technology.

Next, at step 225, the operator positions a strip of electrically self-heating thermoplastic bonding tape 155 under the trailing edge 165 of rear carpet section 115 such that approximately one half of the width of the tape 155 protrudes from under the trailing edge 165. Then, at step 230, the operator aligns the leading edge 160 of the front carpet section 110 with the trailing edge 165 of the rear carpet section 115 so that each of the sections overlies a portion of the electrically self-heating thermoplastic bonding tape 155. The operator moves the carpet into alignment by operating positioning roller 80 to pull carpet from the source carpet roller assembly 15 until front and rear carpet sections 110 and 115 abut and the carpet pattern matches across the area to be seamed. In the preferred embodiment, the operator then uses carpet pins as necessary to releasably affix the carpet sections to the work surface adjacent to the area to be seamed.

Once the electrically self-heating thermoplastic bonding tape 155 is in place, at step 235, the electric current source electrodes 140 and 145 are attached to either end of the tape 155 and an electric current is provided from electric current source unit 120. The electric current causes the electrically self-heating thermoplastic bonding tape 155 to heat, melting the thermoplastic bonding agent to fuse the front and rear carpet sections 110 and 115 to each other and to the tape 155. If desired, the operator may also apply a seam sealer compound prior to application of the electric current to enhance the quality of the final carpet seam 125. Such seam sealing compounds are well known in the art.

At this point, the operator may hand roll the seam to ensure full and even penetration and dispersion of the thermoplastic bonding agent along the seam 125. Next, at step 240, the electrically self-heating thermoplastic bonding tape 155 is allowed to cool forming a thermoplastic bond between itself and the front and rear carpet sections 110 and 115, thereby joining the carpet sections along seam 125 to form a new full length carpet section 30. Once the thermoplastic bonding agent has fully hardened, any carpet retaining pins are removed and pneumatic press roller 85 and pneumatic presser bar 90 are lifted. Then, at step 250 the joined full-length carpet is advanced either to the next carpet section or rolled fully onto take-up roller assembly 25.

Thus, it can be seen that an advantageous method may be had for manufacturing a continuous roll of carpet according to the present invention, wherein defective sections may be removed and the remaining sections may be rejoined. A work station situated between two rollers enables the carpet sections to be easily and accurately aligned while maintaining a continuous roll.

What have been described above are preferred embodiments of the present invention. It is, of course, not possible to describe every conceivable combination of methodologies for purposes of describing the present invention. However, one of ordinary skill in the art will recognize that many further combinations, permutations and modifications of the present invention are possible. Therefore, all such possible combinations, permutations and modifications are to be included within the scope of the claimed invention, as defined by the claims below.

We claim:

1. A system for forming a carpet seam between first and second carpet sections to create a continuous roll of carpet, said system comprising:

a carpet source for providing carpet, said carpet source including a driver for moving said carpet;

a seaming support for receiving carpet from said carpet source, said seaming support having a substantially planar work surface for supporting said carpet after said carpet has been divided into first and second carpet sections, said substantially planar work surface having opposing lateral sides;

a bi-directional positioning roller for advancing one of said first or second carpet sections to a position overlying said work surface and in abutment with the other of said first or second carpet sections;

a strip of electrically self-heating thermoplastic bonding tape for joining said first and second sections of carpet, said strip extending transversely across said work surface such that one end of said strip is positioned adjacent to one lateral side of said work surface and the other end of said strip is positioned adjacent to said opposing lateral side of said work surface; and an electric current source for providing an electric current to said electrically self-heating thermoplastic bonding tape, said electric current source disposed to provide electric current to each of said ends of said strip;

whereby, when heated, said electrically self-heating thermoplastic bonding tape joins said first and second carpet sections into a continuous length of carpet.

2. The system of claim 1, further including a take-up roller assembly for receiving carpet from said seaming support, said take-up roller assembly including a driver for moving carpet.

3. The system of claim 1, wherein said seaming support further includes a press clamp roller for clamping said carpet to said work surface.

4. The system of claim 1, further including guide rollers for guiding carpet from said carpet source to said seaming support and from said seaming support to said take-up roller.

5. The system of claim 1, wherein said work surface is piercable to allow insertion of carpet pins to affix one of said first or second carpet sections to said work surface and to provide a suitable medium for cutting carpet with either a surface cutting blade or a back cutting blade.

6. The system of claim 1, further including a dispenser for dispensing electrically self-heating thermoplastic bonding tape.

7. The system of claim 1, further including a presser bar for clamping said carpet to said work surface.

8. The apparatus of claim 1, further including a controller for regulating a parameter selected from the group consisting of: carpet driver speed, carpet driver direction, clamp position, electric current flow through said electrically self-heating thermoplastic bonding tape, and temperature of said electrically self-heating thermoplastic bonding tape.

9. A method for forming a seam to join first and second sections of carpet for creating a continuous roll of carpet, said method comprising the steps of:

providing a substantially planar seaming support;

positioning the leading edge of a first carpet section from a carpet source upon said seaming support;

positioning the trailing edge of a second carpet section upon said seaming support;

aligning said leading edge of said first carpet section and said trailing edge of said second carpet section upon said seaming support such that said trailing edge of said second carpet section is aligned with said leading edge of said first carpet section, wherein said trailing edge and said leading edge extend transversely across the surface of said seaming support;

applying an electrically self-heating thermoplastic bonding tape along the adjacent surfaces of said first and second carpet sections;

applying an electric current to said electrically self-heating thermoplastic bonding tape to heat the tape; and allowing said electrically self-heating thermoplastic bonding tape to cool, thereby joining said first and second carpet sections.

10. The method of claim 9, further including the step of releasably attaching one of said carpet sections to said seaming support.

11. The method of claim 10, wherein said attaching step includes the step of releasably attaching one of said carpet sections to said seaming support with pins.

12. The method of claim 9, further including the step of clamping one of said carpet sections to said seaming support with a press clamp roller.

13. The method of claim 9, further including the step of applying a seam sealing compound to said seam.

14. The method of claim 10, further including the step of applying pressure to said seam while cooling.

15. The method of claim 14, wherein said pressure applying step includes the step of rolling a seam roller along said seam.

16. A method for removing a defective section from a roll of carpet and rejoining the resulting carpet sections to form a continuous roll of carpet, said method comprising the steps of:

providing a carpet source;

attaching the leading edge of carpet from said carpet source to a take-up roll, such that a section of said carpet overlays a substantially planar seaming support;

advancing said carpet onto said take-up roll until a defective section of said carpet overlays said seaming support;

stopping said advancing of said carpet when said defective section overlays said seaming support such that said seaming support functions as a substantially planar work surface;

removing said defective carpet section by transversely cutting said carpet, thereby creating a first carpet section having a leading edge and a second carpet section having a trailing edge;

positioning the leading edge of said first carpet section upon said seaming support;

positioning the trailing edge of said second carpet section upon said seaming support;

aligning said leading edge of said first carpet section and said trailing edge of said second carpet section such that said trailing edge of said second carpet section is aligned with said leading edge of said first carpet section, wherein said leading edge and said trailing edge extend transversely across the surface of said seaming support;

applying an electrically self-heating thermoplastic bonding tape along the adjacent surfaces of said first and second carpet sections;

applying an electric current to the electrically self-heating thermoplastic bonding tape to heat the tape; and allowing the electrically self-heating thermoplastic bonding tape to cool and join said first and second carpet sections.

17. The method of claim 16, further including the step of removably affixing one of said carpet sections to said seaming support.

18. The method of claim 16, further including the step of applying a seam sealing compound to said seam.

19. The method of claim 16, wherein said cooling step includes the step of applying pressure to said seam.

* * * * *